United States Patent [19]
Hill et al.

[11] Patent Number: 5,480,003
[45] Date of Patent: Jan. 2, 1996

[54] PASSIVE LUBRICATION DELIVERY SYSTEM AND INTEGRAL BEARING HOUSING

[75] Inventors: Jason J. Hill, Manchester; Joseph L. Tevaarwerk, Clayton, both of Mo.

[73] Assignee: Emerson Electric Co., St. Louis, Mo.

[21] Appl. No.: 303,365

[22] Filed: Sep. 9, 1994

[51] Int. Cl.⁶ .................................................. F01M 9/00
[52] U.S. Cl. ........................ 184/6.12; 184/11.2; 184/62; 384/404; 384/438; 74/467
[58] Field of Search ................................ 184/6.12, 11.1, 184/11.2, 11.4; 384/62, 403, 404, 440, 438; 74/467

[56] References Cited

U.S. PATENT DOCUMENTS

| | | | |
|---|---|---|---|
| 697,629 | 4/1902 | Keiper | 184/11.1 |
| 3,107,130 | 10/1963 | Lakey et al. | 384/404 |
| 4,648,485 | 3/1987 | Kovaleski | 384/404 |
| 4,745,816 | 5/1988 | Horiuchi et al. | 74/467 |
| 5,064,025 | 11/1991 | Richards | 184/6.12 |

FOREIGN PATENT DOCUMENTS

| | | | |
|---|---|---|---|
| 0439703 | 6/1912 | France | 184/11.2 |
| 0906394 | 3/1954 | Germany | 384/404 |
| 1440526 | 6/1976 | United Kingdom | 184/11.1 |

OTHER PUBLICATIONS

*Encyclopedia of Plastics* pp. 19, 30–31 Dec. 1989.

*Primary Examiner*—Thomas E. Denion
*Attorney, Agent, or Firm*—Polster, Lieder, Woodruff & Lucchesi

[57] ABSTRACT

A bearing lubrication system in which a shaft is journaled for rotation in an integral bearing in a gear box, the bearing being primarily loaded through less than its full circumference, leaving an unloaded reach of the bearing, the bearing being interrupted through a substantial arc in at least a portion of the unloaded reach to define a gap in the bearing through which lubricant travels, is provided with a fixed scoop for channeling lubricant into the gap. The bearing is a solid bearing, of a piece with a gear box housing, as is the scoop.

24 Claims, 4 Drawing Sheets

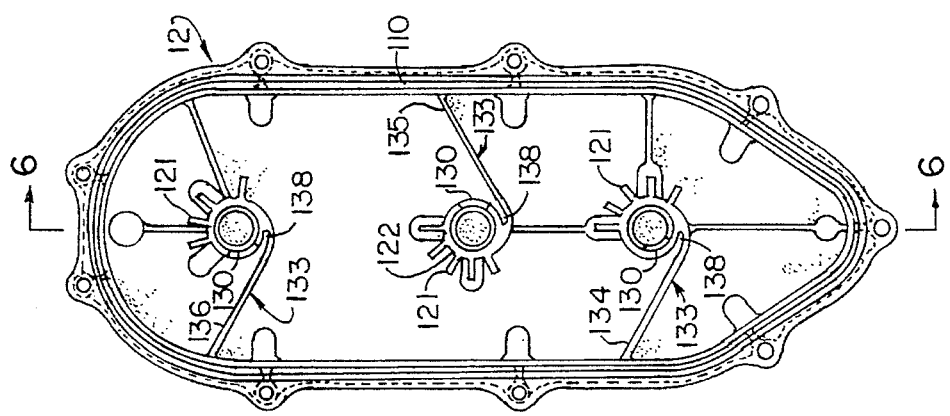
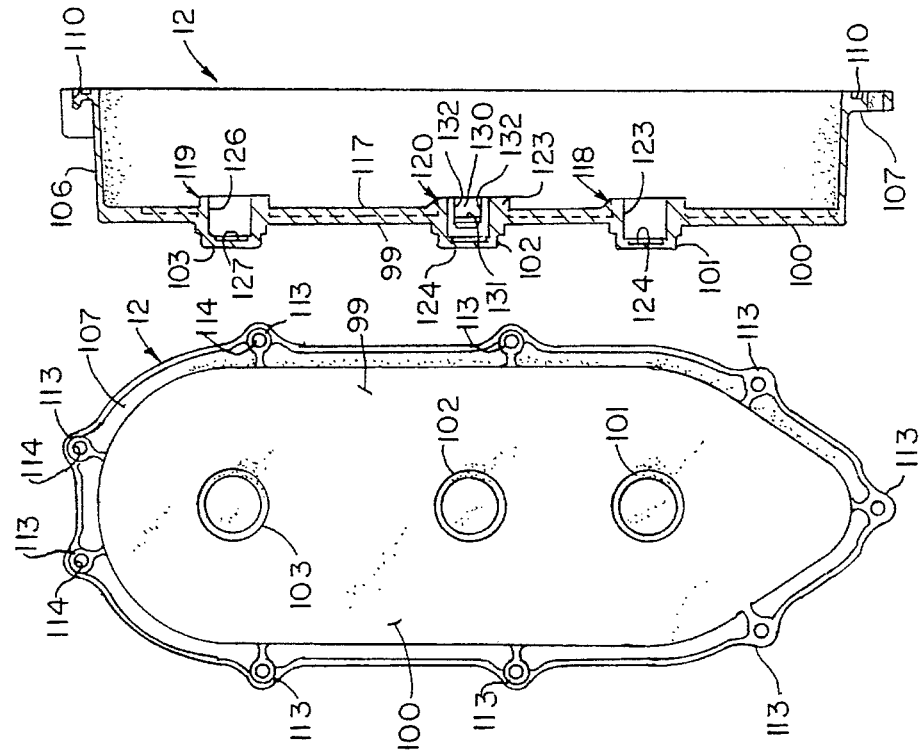
FIG. 5
FIG. 6
FIG. 7
FIG. 10
FIG. 11

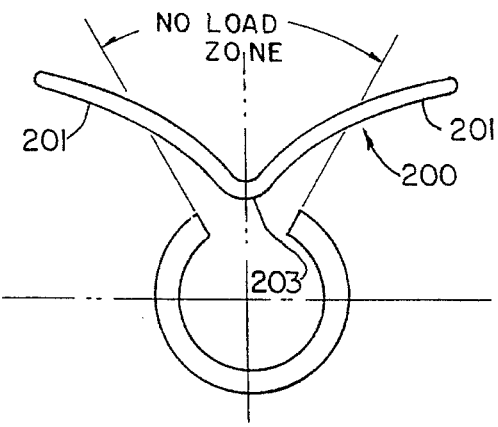
FIG. 12
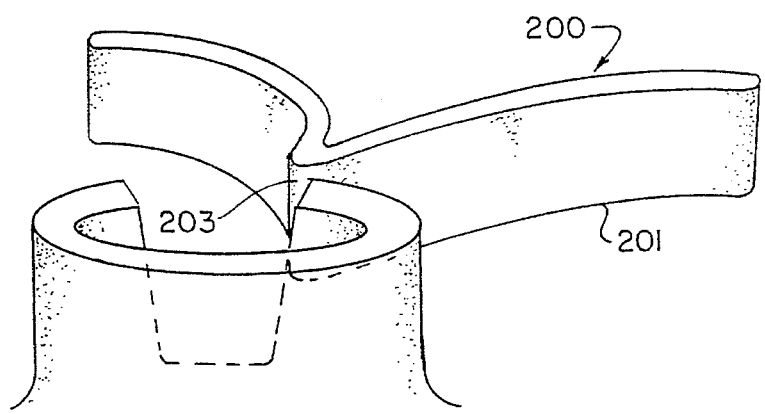
FIG. 13
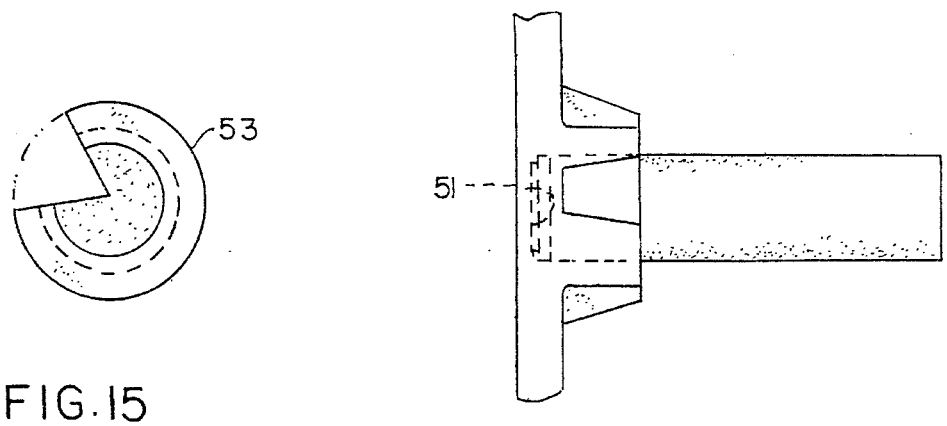
FIG. 15
FIG. 14

5,480,003

PASSIVE LUBRICATION DELIVERY SYSTEM AND INTEGRAL BEARING HOUSING

BACKGROUND OF THE INVENTION

This invention has particular, but not exclusive application to gear boxes in which a multiplicity of gears, intermeshing with one another, are off set vertically from one another. In such a gear boxes, lubrication of the upper of the gears and bearings has always been a problem. Lubricant can be pumped to the upper gear shaft bearings and to the gears themselves, but that requires an active mechanism. The gear case can be filled with oil, but that requires either assiduous attention to the oil level or an external reservoir, and multiplies the problems of leakage. The housing of such gear boxes has been made of cast iron or aluminum, and the bearings themselves have been either bushed or have been rolling element type bearings. The gears have generally been made of metal, and are subject to breakage if the bearings seize or the gears themselves are not properly lubricated.

One of the objects of this invention is to provide a bearing lubrication system that permits the use of a semi-fluid lubricant.

Anther object is to provide such a system that permits the making of the bearings of a piece with the housing itself.

Another object is to provide a bearing lubrication system that provides adequate lubrication to all of the gears in a multi-gear speed reducer.

Other objects will become apparent to those skilled in the art in the light of the following description and accompanying drawing.

SUMMARY OF THE INVENTION

In accordance with this invention, generally stated, in a bearing lubrication system in which a shaft is journalled for rotation in a bearing, in a gear box, the bearing being primarily loaded through less than its full circumference, leaving an unloaded reach of the bearing, the bearing is interrupted through a substantial arc in at least a portion of the unloaded reach to define a gap through which lubricant travels. A scoop, in the form of a ledge, preferably integral with the housing inner wall, channels lubricant into the gap. The gap and the scoop serve the double function of providing lubricant to the journal, and of circulating the lubricant. Preferably, the lubricant is in the form of a semi-fluid, a light grease, which not only provides excellent lubrication, but is less liable than the usual lubricating oil to leak from the seals around the input and output shafts or between parts of the gear housing. The scoops associated with unidirectional gears, are preferably made in such a way as to provide a trap for wear debris. The lubrication system is so efficient that the bearings can be made of a piece with the housing, which is preferably made of an alloy with greater lubricity than iron or aluminum.

In a gear box in which the gears are intended to be run in either direction, as in a hospital bed adjusting mechanism, for example, the scoop can take the form of a gull wing ledge. In a unidirectional gear box, the scoop preferably takes the form of a spiral oriented in such a way that the rotational action of the gear promotes lubricant into the mouth and toward the center of the spiral, and so into the bearing gap. The gears themselves may be provided with paddles projecting axially from a web between a hub of the gear and its rim.

DRAWINGS

In the drawing, FIG. 1 is a view, partly cut away and partly in section, showing a gear reducer incorporating one illustrative embodiment of lubrication system of this invention;

FIG. 5 is a view in elevation, viewed from left to right, of the gear housing part of the gear box of FIG. 1;

FIG. 6 is a sectional view taken along the line 6.6 of FIG. 5;

FIG. 7 is a view in elevation, viewed from right to left of FIG. 1, of the gear housing of FIGS. 5 and 6;

FIG. 10 is a view in side elevation of a second embodiment of idler gear;

FIG. 11 is a diametric sectional view of the gear shown in FIG. 10;

FIG. 12 is a view in elevation of another embodiment of scoop and bearing of this invention;

FIG. 13 is a fragmentary view in perspective of the scoop and bearing shown in FIG. 12;

FIG. 14 is a fragmentary view in side elevation of a bearing; and shaft, and

FIG. 15 is a somewhat diagrammatic view in front elevation of the bearing shown in FIG. 14.

DESCRIPTION OF THE PREFERRED EMBODIMENT

Figure 1:
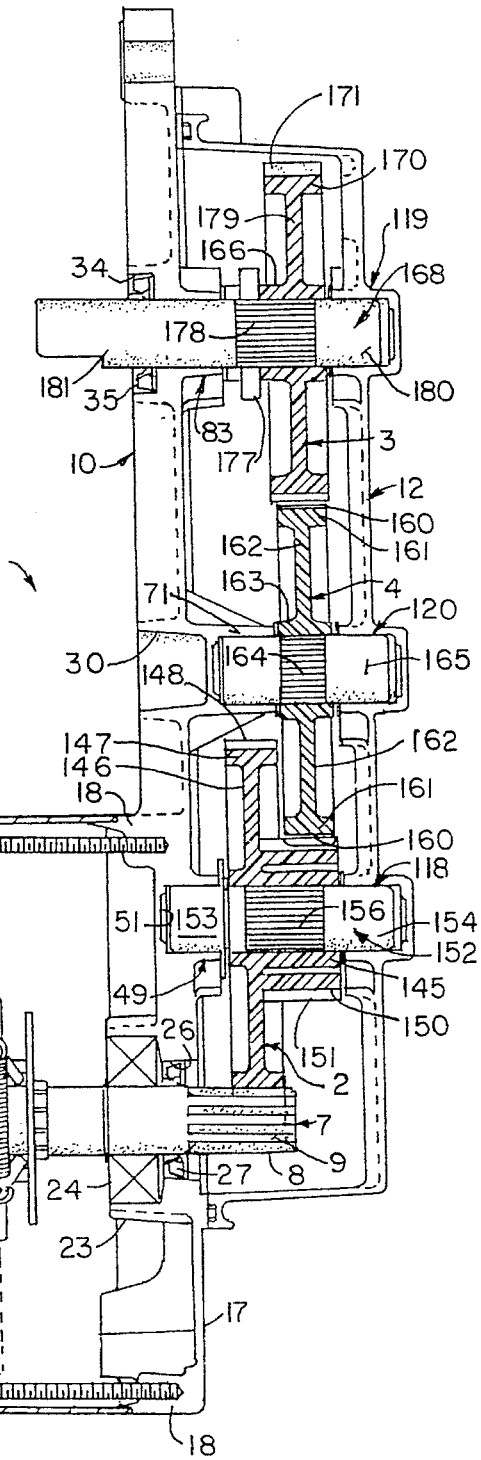
Figure 2:
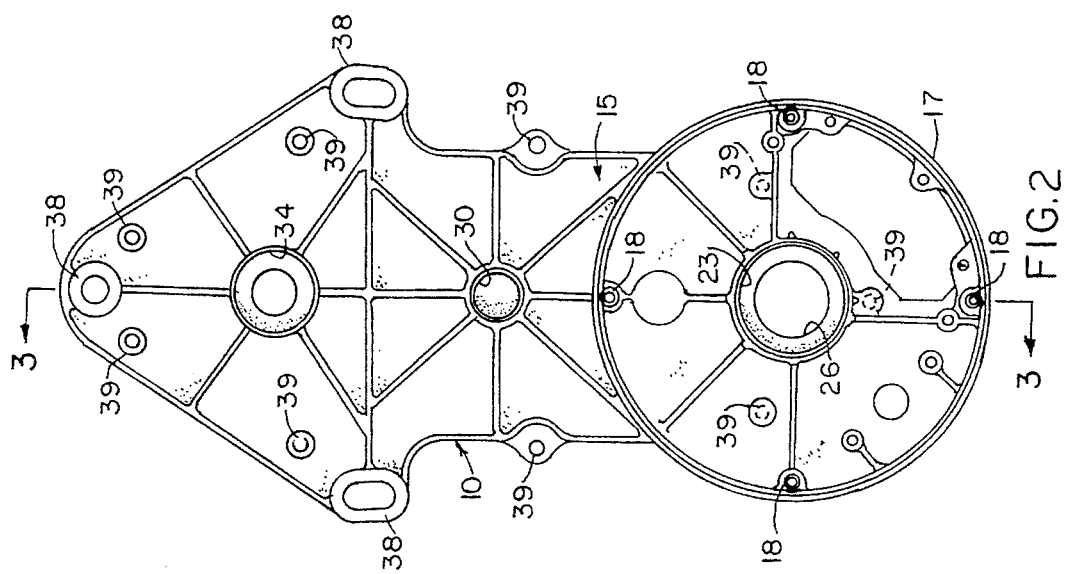
FIG. 2 is a view in rear elevation of a gear housing cover part of a gear box of the reducer of FIG. 1.

Referring now to FIG. 1, reference numeral 1 indicates a gear box containing an input gear 2, an output gear 3, and an idler gear 4. In this embodiment, A motor 5 is bolted to the gear box. The motor 5 has a shaft 7, on the projecting end of which is a drive gear 8 that extends into the interior of the gear box 1. The gear box and motor constitute a gear reducer.

The gear box 1 is made up of a gear housing cover 10 and a gear housing 12. The cover 10 has a motor mounting plate 17 that constitutes an inner end shield of the motor 5. The mounting plate 17 has bolt bosses 18, internally threaded to receive threaded ends of through-bolts 19, which extend through an outer end shield 20.

Referring now to FIGS. 1, 2, 3 and 4, an external side 15 of the cover 10 has a bearing ring 23, in which a motor bearing 24 is seated, and a seal ring 26, in which a lubricant seal 27 is seated.

A blind, cup-shaped idler gear locator 30 is positioned vertically above the seal ring 23 and above the motor plate 17. An output shaft seal ring 34, in which an output shaft seal 35 is seated, is vertically aligned with the center lines of the input shaft seal ring 26 and the locator 30. Stiffener ribs are cast into the outer surface of the external side 15, to provide reinforcement and rigidity to the seal rings and locator. Gear box mounting bolt hole ears 38 are provided to permit the entire gear reducer to be mounted on a machine. Internally threaded assembly bolt bosses 39 are provided to permit the assembly of the gear box, as is described hereinafter.

An interior side 40 of the cover 10 has formed in and on it an input shaft passage 42, located in a reservoir or sump section 44. The reservoir section 44, and an interior side of the gear box is defined in part by a tongue or rib 45. The open mouths of the assembly bolt bosses 39 are positioned outboard of the tongue 45.

Figure 3:
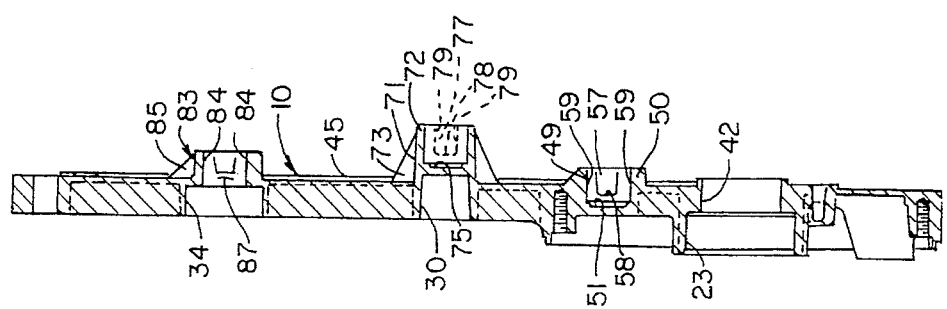
FIG. 3 is a sectional view taken along the line 3.3 of FIG. 2.

An input gear bearing 49 is cast as one piece with the cover 10. The input bearing is defined by a side wall 50, and a closed bottom wall 51. The side wall 50 is strengthened and stiffened by gussets 52, which are positioned around a loaded side 53 of the bearing. Diametrically opposite the load side 53, the bearing has an unloaded side 54 in which a gap 57 is provided. The gap 57 is defined by a bottom edge 58 and side edges 59. The bottom edge 58 of the gap 57 lies above the bottom 51 of the bearing, as shown in FIGS. 3 and 14, to provide a bearing surface in the inside surface of the side wall between the bottom edge and the bottom wall. The side edges 59 diverge toward an open mouth of the gap that extends through the outer edge of the bearing side wall 49. The divergence of the edges 59 determines the rate of circulation of a given lubricant at any given speed of rotation of the gears. A draft of 5° has been found satisfactory with the lubricant of choice, but the optimum draft will vary with the type of lubricant, the speed of rotation of the gears, and other factors.

Figure 4:
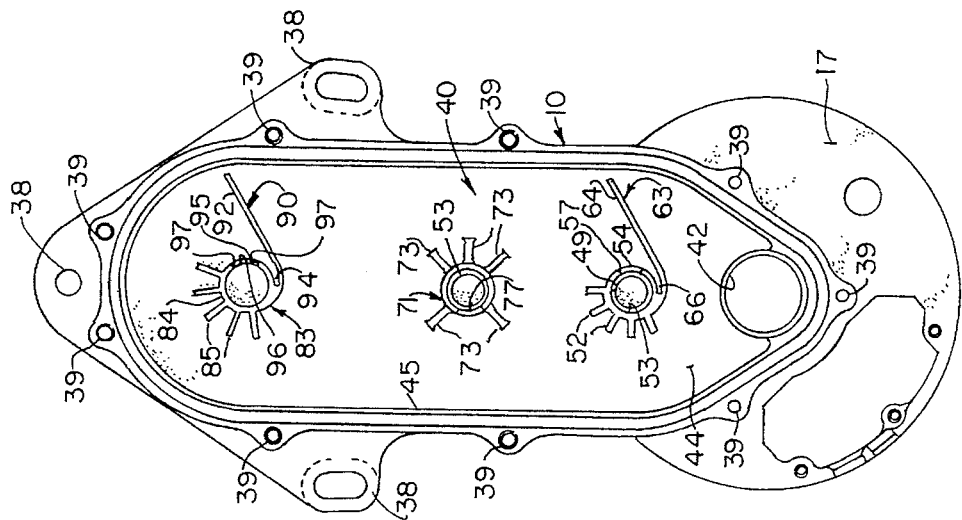
FIG. 4 is a view in front elevation of the gear cover shown in FIGS. 2 and 3.

An input gear bearing scoop 63 is integral with the cover interior 40. The scoop 63 of this embodiment is in effect an attenuated spiral, the outer reach of which is a substantially linear ledge 64, tangent to a circle concentric with the bearing 49 but of a larger diameter. At its inner end, the ledge is curved toward and is joined to a side wall of the bearing. It meets the bearing outside wall below the gap 57, to form a pocket 66. Shafts of the input, idler and output gears are parallel with one another transversely of the gear box and are aligned vertically; input, idler and output bearings in which the shafts are journaled are of necessity similarly oriented. The ledge 64 in this embodiment is of substantially the same height as the bearing, and extends at an angle of about 30° from the horizontal, i.e. from a perpendicular from the vertical plane defined by the axes of rotation of the shafts. The ledge 64 extends to a point near but clear of the rib 45. In the direction in which FIG. 4 is viewed, the drive gear 8 rotates counterclockwise, driving the input gear 2 clockwise. Lubricant carried by the gear 2 is therefore directed onto and promoted along the ledge 64 in the direction of the pocket 66 and gap 57. Also, lubricant that is moved by gravity down the interior side 40 of the cover 10 vertically above the ledge will be caught by the ledge 64 and directed by it to the pocket 66 and the gap 57.

An idler bearing 71 is offset inwardly from the input bearing 49, as shown clearly in FIGS. 1 and 3. The idler bearing has a side wall 72 and a bottom wall 75. Gussets 73, of necessity higher than the gussets 52 of the input bearing, are positioned around a load side 53 of the bearing. A gap or opening 77 in an unloaded reach of the side wall 72 is defined by a bottom edge 78, and side edges 79. These are shaped and positioned in the same way as the edges 58 and 59 of the input bearing 49, and, as in the input bearing, the bottom edge of the gap 77 is above the bottom wall 75, to leave a bearing surface between the bottom edge and the bottom wall.

An out put bearing 83 has a side wall 84, and gussets 85 around a loaded side. The bearing 83 has no bottom wall, but has an out put shaft opening 87, concentric with seal ring 34. The out put bearing has a scoop 90, with a ledge 92 parallel with the ledge 64 of the scoop 63. Like the scoop 63, the scoop 90 is of substantially the same height as the bearing 83, and extends near but clear of the rib 45. It also has a pocket 94, located below a gap or opening 95, defined by a bottom edge 96 and side edges 97 substantially similar to the bottom edge 58 and side edges 59 of the gap in the input shaft being side wall.

Referring now to FIGS. 1, 5, 6 and 7, for a description of the gear housing 12, the gear housing is in the form of an open bottomed box, with an outside wall forming the top of the box, and a side wall 106. Unlike the exterior surface of the gear housing cover, the external surface of the outside wall 100 is planar, interrupted only by thimbles 101, 102, and 103. The thimble 101 constitutes a portion of a side wall 123 of an input gear bearing, and a bottom wall 124 of the input gear bearing. The portion of the side wall 123 on the inside of the wall 100 is provided with a gap or opening 130, which is substantially the same as the opening 57 in the input bearing of the cover 10. The input bearing 118 is also provided with a scoop 133, a mirror image of the scoop 63 of the input bearing 49.

An idler gear bearing 120 has a side wall 123, and a bottom wall 124. The side wall has gussets 121 on a loaded side 122, and a gap or opening 130, defined by a bottom edge 131 and side edges 132. The opening 130 is the same in form and position as the opening 130 in the input bearing side wall. Unlike the idler bearing 71 on the cover, the idler bearing 120 of the gear housing side does have a scoop 133, with a ledge 135 and a pocket 138. The ledge 135 extends at a 30° angle from the horizontal, but in the opposite direction from the ledge 134 of the input bearing 118, because the idler gear rotates in the opposite direction from the input gear.

An output bearing 119 has a side wall 126 and a bottom wall 127. It also has a gap 130, of the same character as the gaps 130 of the input and idler bearings, a scoop 133, a ledge 136, parallel with the ledge 134, and a pocket 138 just below the opening 130. The side wall 126 has stiffening gussets 121 on a loaded side.

Referring now to FIG. 1, the input gear 2 has a hub 145, a rim 147 and a web 146 extending uninterruptedly between the hub 145 and the rim 147. Gear teeth 148 project radially from the rim 147. A drive or reduction gear 150 is of a piece with the web 146 and projects axially over a portion of the hub 145. The gear 150 has gear teeth 151. The teeth 148 of the gear 2 mesh with the teeth 9 of the drive gear 8 of the motor shaft 7. The teeth 151 of the drive or reduction gear 150 mesh with teeth 160 of the idler gear 4. The input gear hub 145 is pressed on to a knurled or splined section 156 of a shaft 152. A journal section 153 of the shaft 152 is journaled in the cover bearing 49; a journal end 154 of the shaft 152 is journaled in the bearing 118 in the housing 12. The spacing of planar facing surfaces of the bearings 49 and 118 is such that the hub 145 fits closely but readily rotatably between them.

The idler gear 4 has a hub 163 which is symmetrical about a web 162, and a rim 161 from which the teeth 160 project. The idler gear 4 is pressed on to a knurled or splined section 164 of a shaft 165, journal ends of which are journaled in bearings 71 and 120. The length of the bearing 71 is such as to position the idler gear 4 outboard of the in put gear 2, as shown clearly in FIG. 1.

The output gear 3 has a hub 166, asymmetrical with respect to a web 179, extending between the hub and a rim 170. The hub 166 is longer on the side facing the bearing 83, and is pinned to a shaft 168, as well as being pressed on to a knurled or splined section 178. The shaft 168 is an output shaft, and is journaled at one end 180 in the bearing 119 in the gear housing, and projects at its other end 181 through the bearing 83 in which is journaled, through the seal 35, and sufficiently far to permit its being coupled to whatever is to be driven. In the embodiment shown, the projecting output end 181 is shown as having a flat. The shaft 168 is, in this embodiment, pinned to the hub 166 by means of a roll pin 177. It can, of course, be keyed or splined to the shaft, but the gear must be secured sufficiently to ensure that it drives the shaft 168 without slippage, unless there is a clutch-like arrangement, responding to a predetermined amount of torque. The roll pin 177 could also be a shear pin to protect the gears and motors and the driven mechanism from damage.

Figure 8:
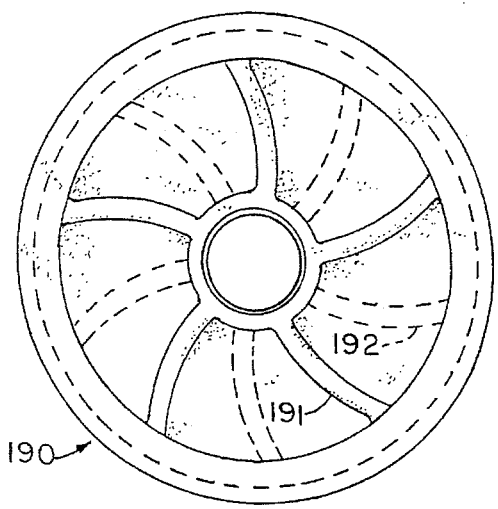
FIG. 8 is a view in side elevation of a second embodiment of output gear of this invention.
Figure 9:
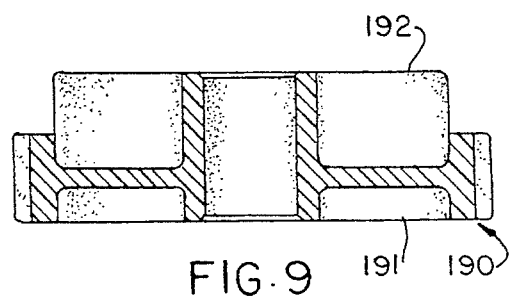
FIG. 9 is a sectional view taken diametrically through FIG. 8.

Referring now to FIGS. 8 and 9 for another embodiment of output gear, gear 190, identical in all other respects to the output gear 3, is provided with paddles 191 on the side toward the bearing 119 and paddles 192 on the side adjacent the bearing 83. The paddles are curved from the hub to the rim, in a direction toward the scoops 90 and 133. As can be seen, the paddles 192 are wider, axially, than the paddles 191, so as to put them close to the scoop 90 over and around the long, pinned section of the hub 166.

In FIGS. 10 and 11, a modified idler gear is shown, identical with the idler gear 4 except for the provision, in gear 194 of paddles 195 which, like the paddles 191 and 192 are curved in a direction toward the scoop 133. The paddles 195 are symmetrical about the web.

Referring now to FIGS. 14 and 15, in FIG. 14, the shaft can be that of any of the gears. The shaft extends near but not against the bottom wall of the beating, but beyond the bottom edge of the gap. The side edges of the gap are shown with a somewhat exaggerated flare. The path of grease in the opening has been found to pass down one side edge, across the bottom edge and up the other side edge, hence, out of the opening. This flow path ensures not only that the lubricant reaches the bearing and journal, but that fresh lubricant is supplied continuously, and that wear debris is flushed from the bearing. It has also been found that the pocket of the spiral scoop serves the double function of retaining some of the lubricant as a kind of reservoir, and of collecting wear debris.

In FIG. 15, the segment of the side wall that is cut out to form the opening is shown as encompassing approximately 60° of arc, as has been explained, on the unloaded side of the bearing.

Referring now to FIGS. 12 and 14, a modified scoop is shown, adapted for use with a bi-directional gear reducer. Although the gull wing scoop 200, with its symmetrically arranged, arcuate wings 201 and a meeting nose 203 directed midway between the side edges of the gap, provides no pocket, it does direct lubricant into the opening of the bearing. Bi-directional gear boxes are necessarily intermittent in operation, and in such applications as hospital bed adjusting mechanisms, are not operated for long periods at a stretch. Under those circumstances, the gull wing scoop works quite satisfactorily.

It will be observed from the drawings that all of the bearings are cast as one piece with their respective gear box elements. It has been found that, when the lubrication system of this invention is employed, the gear box can be made of a reasonably lubricious alloy, such as ZA3 (Zamak). This construction provides a substantial economy in production, but at the same time the bearings produce results equal to or superior to porous sintered bearings, for example.

The lubricant is conducted by the scoops 133 on the gear housing side, and by the scoops 63 and 90 on the cover side into their respective bearings. It has been found in practice that the idler bearing 71 on the cover side is adequately lubricated by the lubricant that is carried by the input gear to the gap 130, without a scoop. However, a scoop can be provided for the idler gear 71 as well.

The proper lubricant is important to the operation of the lubrication system of this invention. Optimum results have been obtained, in a gear reducer with a motor speed of 1700 RPM and a reduction of sixteen to one, with a semi-fluid grease identified as Kluber PARALIQ GA 3400, a product of Kluber Lubrication North America, Inc. However, other semi-fluid lubricants such as Tribolube 020894, a product of Aeorospace Lubricants, can be used. As has been pointed out, lubricants with different characteristics may require the reshaping of the gaps, as by increasing or decreasing the draft of the side edges, rounding them or slanting them radially, or shortening or lengthening them, to obtain optimum results.

Numerous variations in the construction of the bearing lubrication system of this invention will occur to those skilled in the art in the light of the foregoing disclosure. Merely by way of example, the linear ledge of the spiral scoop can be curved to form an unattenuated spiral with an open mouth toward which the gear rotates. The unattenuated spiral scoop can be made higher than the bearing with which it is associated, and be positioned within the are bit of the rim of the embodiment of gear first described, that is not equipped with paddles. This will reduce the area of the scoop exposed to lubricant moving down the inner wall by gravity, but will increase the effectiveness of the promotion of movement of lubricant by the gear web. The angles of the ledges shown in the preferred embodiment can be varied, depending upon the lubricant and the speed at which the gears are driven. The viscosity and consistency of the lubricant must be such as permit it to return to the sump by gravity, but with that limitation, the viscosity and consistency of the lubricant can vary. The shape of the housing can be varied. The lubrication system can be used with housings of different materials, the system itself supplying lubricant effectively, but the use of an alloy, which can be different from ZA3, has great advantages. In the present embodiment, the input and output gears are preferably made of Acetal plastic, and the idler gear of Nylon. These provide quiet operation and long life. However, metal gears can be used, or other types of plastic or composite material. As has been indicated, the spiral of the scoop can be either a true spiral or an attenuated one. Both are encompassed within the term spiral as used in the claims. The scoops themselves are preferably made integral with the housing, but they may be inserted or otherwise mounted separately. The lubricant can be made thixotropic, particularly when there is intermittent use, which would tend to inhibit leakage through the seals when the gear reducer is idle. The term "unloaded" is not absolute. The main thrust of the shaft against the bearing is through an area removed from the opening, but because some bearing surface is still provided below the bottom edge of the bearing, the area of the bearing in which the opening is, need not be completely devoid of load. The term unloaded or non-loaded is used to signify that the main thrust of the bearing is elsewhere. Although the shafts of the gears in the preferred embodiment shown and described are arranged vertically in a line, the parallel shafts on which the gears are mounted need not be aligned vertically, as long as provision is made for the return to a sump or reservoir of the lubricant. The system of this invention has virtue for a single bearing, although its advantages are more apparent when a plurality or multiplicity of gears and bearings are involved. These variations are merely illustrative.

What is claimed is:

1. In a bearing lubrication system in which a shaft is journalled for rotation in a bearing, and a gear is mounted on said shaft, said bearing being loaded primarily through less than its full circumference, leaving an unloaded reach of said bearing, the improvement comprising said bearing being interrupted through a substantial arc in at least a portion of said unloaded reach to define a gap in said bearing through which lubricant travels, and structural means, adjacent a radial side of said gear and fixed against movement with respect to said bearing, for channeling lubricant into said gap.

2. The improvement of claim 1 wherein the gap has an open mouth directed axially of the bearing and a bottom edge defining said gap, said bottom edge being spaced axially inwardly from an axially outboard reach of said bearing for providing a bearing surface axially beyond said bottom edge of said gap.

3. The improvement of claim 1 wherein said structural means comprises a gull wing symmetrically arranged with respect to said gap.

4. The improvement of claim 1 wherein said shaft is one of a plurality of parallel shafts and said bearing is one of a plurality of bearings all in a single gear case, each of said shafts being journalled in one of said bearings, and carrying a gear, said gears intermeshing with one another and being offset vertically from one another.

5. The improvement of claim 2 wherein said shaft is one of a plurality of parallel shafts and said bearing is one of a plurality of bearings all in a single gear case, each of said shafts being journalled in one of said bearings, and carrying a gear, said gears intermeshing with one another and being offset vertically from one another.

6. The improvement of claim 3 wherein the system includes a plurality of parallel shafts in a single case, each of said shafts carrying a gear, said gears intermeshing with one another and being offset vertically from one another.

7. The improvement of claim 4 wherein the lowermost shaft is driven by a prime mover.

8. The improvement of claim 1 wherein said lubricant is a semi-fluid grease.

9. In a bearing lubrication system in which shafts are journalled for rotation in bearings, each of said bearings being loaded primarily through less than its full circumference, leaving an unloaded reach of said bearing, the improvement comprising said bearing being intermuted through a substantial arc in at least a portion of said unloaded reach to define a gap in said bearing through which lubricant travels, and fixed structural means for channeling lubricant into said gap, said bearing lubrication system comprising a gear box with a plurality of gears, mounted on said shafts and said shafts being parallel to but spaced vertically from one another, and said structural means comprising scoop means adjacent at least one radial side of every gear.

10. The lubrication system of claim 9 wherein the said gap in each being opens in a direction at an angle from the vertical, toward said scoop means.

11. The improvement of claim 9 wherein said gears include an input gear and an output gear, and said scoops are positioned on both sides of said input and output gears.

12. The improvement of claim 11 wherein the gear box contains an intermediate idler gear between said input gear and said output gear, and the axes of rotation of all of said gears are aligned vertically.

13. The improvement of claim 12 wherein said input gear and said output gear are made of Acetal, and the idler gear is made of Nylon.

14. In a bearing lubrication system in which a shaft is journalled for rotation in a bearing, said bearing being loaded primarily through less than its full circumference, leaving an unloaded reach of said bearing, the improvement comprising said bearing being interrupted through a substantial arc in at least a portion of said unloaded reach to define a gap in said bearing through which lubricant travels, and fixed structural means for channeling lubricant into said gap, said bearing lubrication system comprising a gear box with a plurality of gears, mounted on shafts parallel to but spaced from one another, with scoops adjacent at least one side of every gear, said gears including an input gear, an intermediate idler gear, and an output gear, the axes of rotation of which are aligned vertically, scoops on both sides of said input an output gears and said idler having a gear box housing side bearing and a gear box housing cover side bearing, said gear box housing side bearing having a scoop, and said gear box cover side bearing having no scoop.

15. In a bearing lubrication system in which shafts are journalled for rotation in bearings, each of said bearings being loaded primarily through less than its full circumference, leaving an unloaded reach of said bearing, the improvement comprising said bearing being interrupted through a substantial arc in at least a portion of said unloaded reach to define a gap in said bearing through which lubricant travels, and structural means fixed against movement with respect to said shaft for channeling lubricant to said gap, said structural means comprising a spiral flaring radially outwardly to an open mouth and tending radially inwardly to a restricted place adjacent said gap, said shaft rotating in the direction toward said open mouth and said restricted place, whereby lubricant carried by a radial side of a gear mounted on said shaft is directed and promoted toward said gap.

16. The improvement of claim 15 wherein an inner end of said spiral is integral with said bearing and said spiral is attenuated along an outer reach to form a substantially linear ledge tangent to a circle concentric with said bearing, but of greater diameter.

17. The improvement of claim 15 wherein said restricted place constitutes a pocket.

18. In a bearing lubrication system in which each of a plurality of shafts is journalled for rotation in aligned bearings carried by opposed walls of a gear box, each of said shafts carrying a gear, said bearings being loaded primarily through less than their full circumferences, leaving an unloaded reach of each said bearing, the improvement comprising said bearings being interrupted through a substantial arc in at least a portion of said unloaded reach to define gaps in said bearings through which lubricant travels, and scoop means fixed to at least one of said opposed walls contiguous said bearings and adjacent a radial side of said gear for channeling lubricant into said gap.

19. The bearing lubrication system of claim 20 wherein said shafts are parallel to one another and spaced vertically from one another, and said gap is oriented with a mouth opening at an angle to the vertical.

20. The bearing lubrication system of claim 18 wherein the scoop means is in the form of a spiral, narrowing toward the bearing in the direction of rotation of the shaft journalled in said bearing.

21. The bearing lubrication system of claim 18 wherein the lubricant is a semi-fluid grease.

22. The bearing lubrication system of claim 18 wherein said bearings and said scoop means are integral with said gear box walls.

23. The bearing lubricating system of claim 18 wherein said at least one of said gears is provided with paddles along at least one radial side between a hub and a rim of said gear.

24. The bearing lubrication system of claim 20 wherein the scoop means extends beyond the mouth to form a pocket between a wall defining the outside of the bearing and a contiguous wall of said scoop means.

* * * * *